United States Patent [19]
Dairiki et al.

[11] Patent Number: 5,699,111
[45] Date of Patent: Dec. 16, 1997

[54] QUASI-COMPOSITE VIDEO SIGNAL GENERATOR IN CRT DISPLAY UNIT

[75] Inventors: Takeshi Dairiki; Yukihiro Nishida, both of Yokohama, Japan

[73] Assignee: Kabushiki Kaisha Toshiba, Kawasaki, Japan

[21] Appl. No.: 657,527

[22] Filed: Jun. 4, 1996

Related U.S. Application Data

[63] Continuation of Ser. No. 379,954, Jan. 27, 1995, abandoned.

[30] Foreign Application Priority Data

Jan. 31, 1994 [JP] Japan .................... 6-009412
Jan. 18, 1995 [JP] Japan .................... 7-005520

[51] Int. Cl.⁶ .................................................. H04N 17/00
[52] U.S. Cl. .................... 348/181; 348/189; 315/365
[58] Field of Search ........................... 348/180–186, 348/189–191, 745–747, 806, 807, 521–524; 315/365, 368.11, 368.18; H04N 17/00, 17/02, 17/04

[56] References Cited

U.S. PATENT DOCUMENTS

| 4,513,318 | 4/1985 | Wilensky et al. ........... 348/181 |
| 4,538,268 | 8/1985 | Pham Van Cang .......... 344/181 |
| 5,291,276 | 3/1994 | Matsumoto et al. ......... 348/180 |
| 5,298,985 | 3/1994 | Tsujihara et al. ............ 348/806 |
| 5,319,446 | 6/1994 | Simmoto et al. ........... 348/181 |

FOREIGN PATENT DOCUMENTS

| 4-109785 | 4/1992 | Japan . |
| 5-007367 | 1/1993 | Japan . |
| 5-252524 | 9/1993 | Japan . |

OTHER PUBLICATIONS

Milton S. Kiuer et al., Television Electronics : Theory and Servicing, 1983, pp. 813, 522.

*Primary Examiner*—Michael H. Lee
*Attorney, Agent, or Firm*—Oblon, Spivak, McClelland, Maier & Neustadt, P.C.

[57] ABSTRACT

A quasi-composite video signal generator incorporated in a microcomputer having a circuit for generating a quasi-composite video signal to be used to adjust a cathode ray tube (CRT) of a display unit, and the microcomputer being incorporated in the display unit. This generation circuit has a synchronous signal generation section for generating horizontal and vertical synchronous signals, a display setting unit for setting an image to be displayed, and a signal generator for generating a three-state signal Vout according to the image set by the display setting unit and the horizontal and vertical synchronous signals. The signal Vout is converted by a shaping circuit into the quasi-composite video signal, which is applied to drivers of cathode electrodes of the CRT.

20 Claims, 5 Drawing Sheets

QUASI-COMPOSITE VIDEO SIGNAL GENERATOR IN CRT DISPLAY UNIT

This application is a continuation of application Ser. No. 08/379,954, filed on Jan. 27, 1995, now abandoned.

BACKGROUND OF THE INVENTION

1. Field of the Invention

The present invention relates to a display unit adopted for, for example, a television set, and incorporating a quasi-composite video signal generator to artificially generate composite video signals to test and adjust a cathode ray tube (CRT) for white balance, image deflection distortion, image amplitude, etc., during a product finishing process.

2. Description of the Prior Art

Television sets, computers, and measuring equipment of present days require high-quality large-sized CRTs. It is important for these CRTs to correctly adjust peripheral elements. To test the peripheral elements of a CRT of, for example, a television set during a product finishing process, an external signal generator is employed. The external signal generator is set outside the television set and generates quasi-composite video signals to test and adjust the CRT for white balance, color purity, convergence, image deflection distortion, and image amplitude.

The external signal generator complicates the product finishing process, takes a long testing time, and increases costs. When maintaining a television set, the external signal generator must be connected to peripheral elements of a CRT of the television (TV) set through wires. This involves troublesome work and adjustment.

SUMMARY OF THE INVENTION

To solve these problems, an object of the present invention is to provide a quasi-composite video signal generator in a display unit of, for example, a TV set, capable of easily testing and adjusting CRT peripheral elements, to thereby simplify a finishing process and reduce the time and cost of the finishing process.

Another object of the present invention is to provide a quasi-composite video signal generator in a display unit of, for example, a consumer TV set, capable of easily testing and adjusting CRT peripheral elements, to improve the efficiency of maintenance work.

Figure 1:
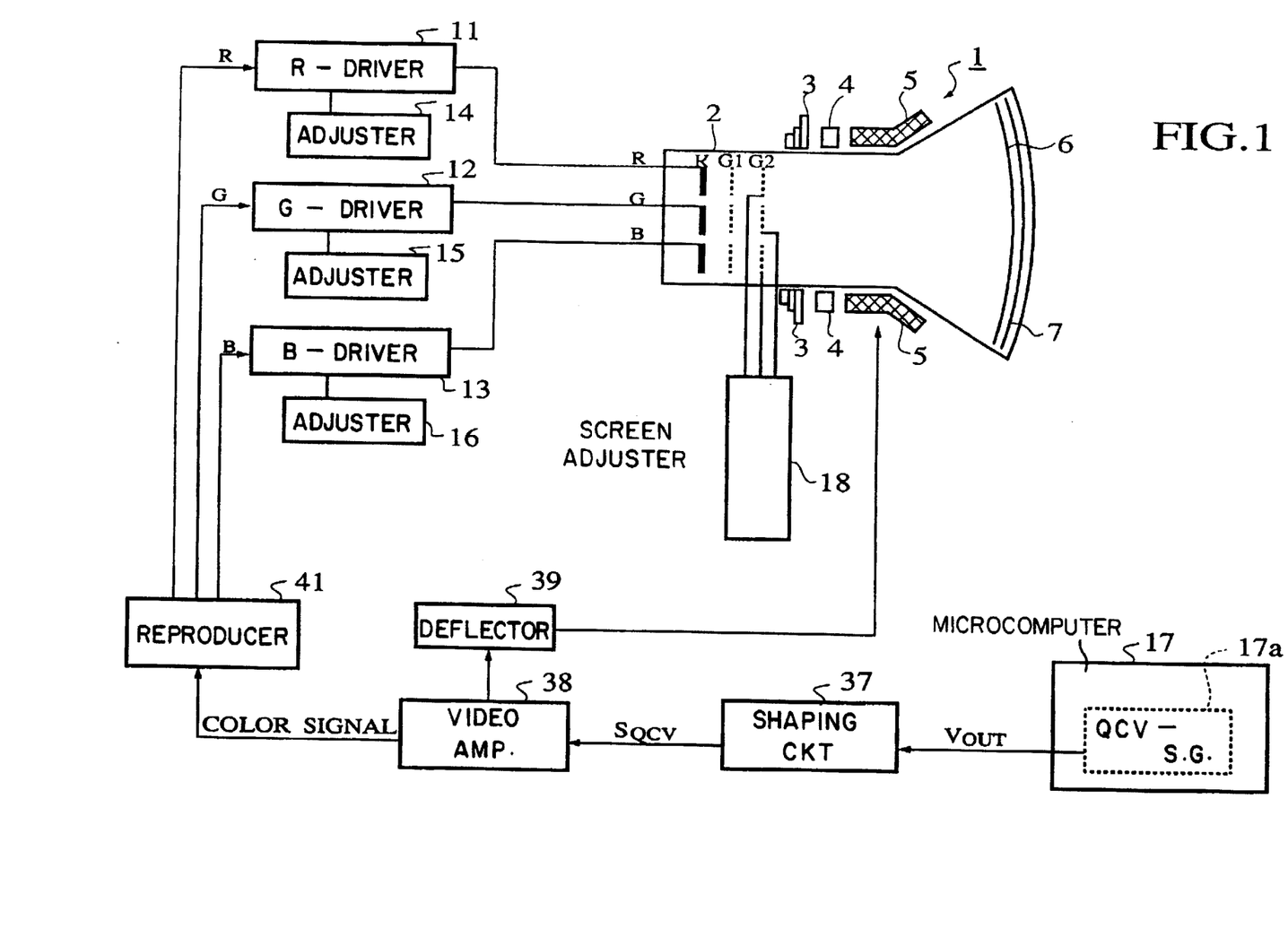
FIG. 1 is a block diagram showing the essential part of a TV set according to an embodiment of the present invention.

In order to accomplish the objects, the present invention provides a quasi-composite video signal generator in a display unit of FIG. 1 at least consisting of:

(a) a cathode ray tube (CRT) 1 incorporating electron guns 2 each having a cathode electrode K and grid electrodes G1 and G2, and surrounded by a color purify magnet 3, a static convergence magnet 4, and a deflection yoke 5;

(b) drivers 11, 12, and 13 connected to the cathode electrodes K, respectively;

(c) a screen adjuster 18 connected to the grid electrodes G1 and G2;

(d) driver adjusters 14, 15, and 16 connected to the drivers 11, 12, and 13, respectively, to adjust cut-off levels and drive voltages;

(e) a color signal reproducer 41 connected to the drivers 11, 12, and 13;

(f) a video amplifier 38 connected to the color signal reproducer 41;

(g) a deflector 39 connected to the video amplifier 38 and deflection yoke 5, to apply a voltage to the deflection yoke 5;

(h) a shaping circuit 37 connected to the video amplifier 38; and (i) a microcomputer 17 for providing the shaping circuit 37 with a three-state signal having three states of "high impedance", "1", and "0".

Figure 4:
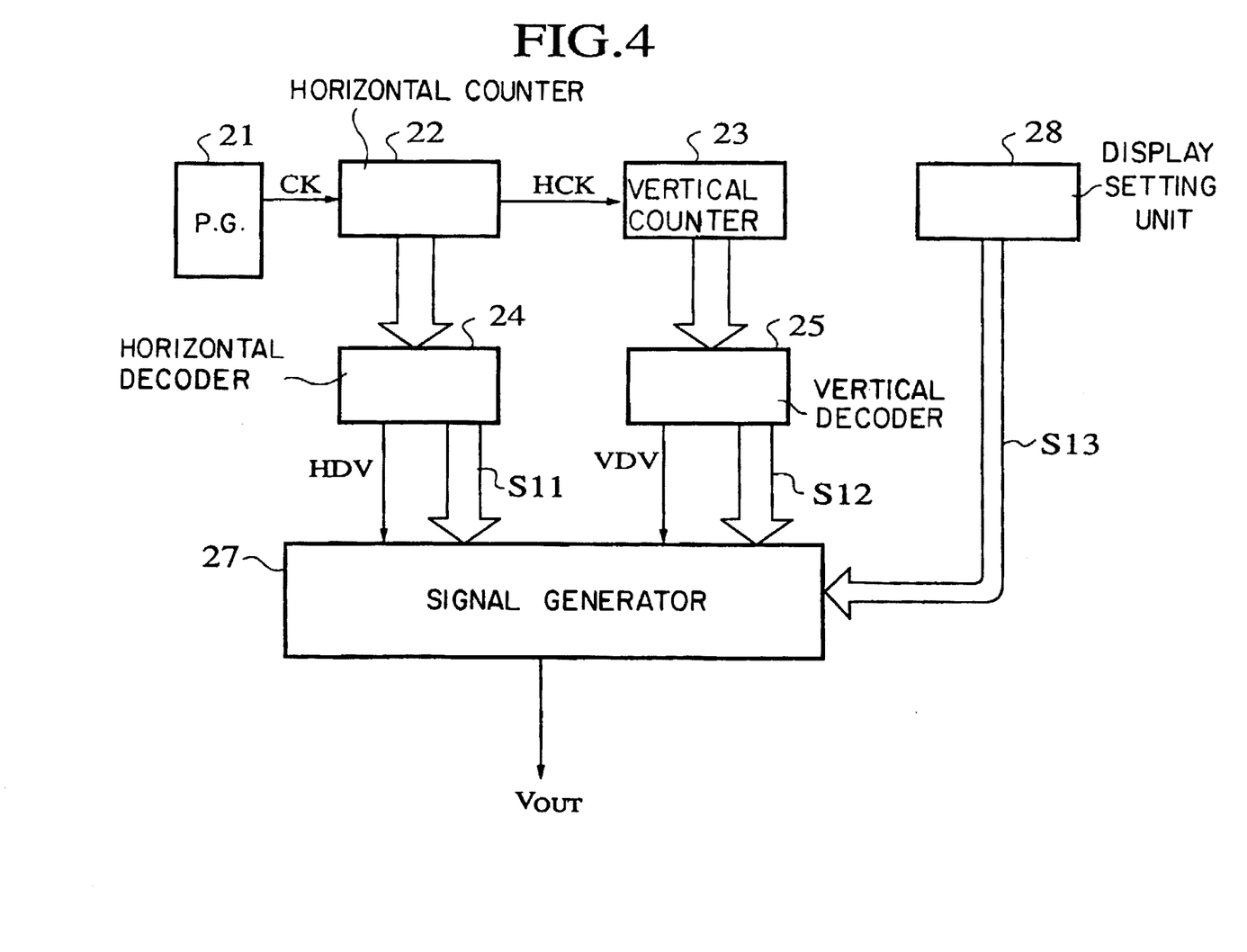
FIG. 4 is a block diagram showing the internal arrangement of a quasi-composite video signal generator 17a of FIG. 1.

When a predetermined signal to display a test image on the CRT 1 is given to the microcomputer 17 incorporated in the display unit, the microcomputer 17 provides a three-state signal Vout. The shaping circuit 37 converts the signal Vout into a quasi-composite video signal Sqcv. In response to the signal Sqcv, the video amplifier 38 provides a color signal. According to the color signal, the color signal reproducer 41 provides the drivers 11, 12, and 13 with color signals, respectively, to display the test image on the CRT 1. The test image is used to adjust voltages applied to the grids G2 as well as adjusting the positions of the color purify magnet 3, static convergence magnet 4, and deflection yoke 5, to thereby control white balance, color purity, etc. There is no need of arranging wires between the display unit and an external color signal generator. Since the display unit of the present invention has its own color signal generator, it completes the adjustment of the CRT within a short time. As shown in FIG. 4, the microcomputer 17 incorporates a synchronous signal generating section (21, 22, 23, 24, and 25) for generating a quasi-horizontal synchronous signal HDV and a quasi-vertical synchronous signal VDV, a display setting unit 28 for setting an image to be displayed, and a signal generator 27 for generating a three-state signal having states of "high impedance", "1", and "0" according to the image set by the display setting unit 28 and the quasi-horizontal and vertical synchronous signals HDV and VDV. Since it is not necessary to generate analog color signals, the structure of the microcomputer 17 is simple.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIG. 1 is a block diagram showing the essential part of a TV set according to a first embodiment of the present invention. This TV set receives color images transmitted according to an NTSC method. The TV set has a color cathode ray tube (CRT) 1. The neck of the CRT 1 incorporates three electron guns 2 for red (R), green (G), and blue (B) to emit, control, accelerate, and converge electron beams. Each of the electron guns 2 has a cathode electrode K, a first grid electrode G1, and a second grid electrode G2. The neck of the CRT 1 is surrounded by a color purify magnet 3 and a static convergence magnet 4. These magnets are arranged from the neck toward the cone of the CRT 1. The color purify magnet 3 is formed of two annular permanent magnets to adjust color purity. An opening angle of the two annular magnets determines the strength of a magnetic field, and a simultaneous turn of the two annular magnets changes the direction of the magnetic field. The static convergence magnet 4 is formed of a four-pole magnet and a six-pole magnet, to slightly move red and blue electron beams to thereby adjust convergence.

The cone of the CRT 1 is provided with a deflection yoke 5 consisting of a horizontal deflection coil and a vertical deflection coil. The deflection yoke 5 is horizontally and vertically movable during adjustment. A shadow mask (a color selection mechanism) 6 has many holes and is attached to a faceplate glass panel of the CRT 1. A three-color phosphor screen 7 covers the holes of the shadow mask 6. Incident angles of three electron beams passing through each hole of the shadow mask 6 determine a color on the CRT 1. An electron beam from the R electron gun 2 passes through a hole on the shadow mask 6 and hits only a red spot on the phosphor screen 7. Similarly, an electron beam from the G electron gun 2 hits only a green spot on the phosphor screen 7, and an electron beam from the B electron gun 2 hits only a blue spot on the phosphor screen 7.

The cathodes K of the three electron guns 2 of the CRT 1 are connected to R, G, and B drivers 11, 12, and 13, respectively. The R, G, and B drivers 11, 12, and 13 are connected to R, G, and B driver adjusters 14, 15, and 16, respectively. The R, G, and B drivers 11, 12, and 13 receive primary color signals R, G, and B, respectively, to drive the respective cathode electrodes K. The R, G, and B driver adjusters 14, 15, and 16 adjust R, G, and B cut-off levels, respectively, as well as adjusting drive voltages applied to the respective cathode electrodes K, to change R, G, and B anode currents. The R, G, and B driver adjusters 14, 15, and 16 are controlled by manipulating variable-resistance knobs on a chassis of the TV set, or on a control panel incorporated in the TV set.

Figure 2:
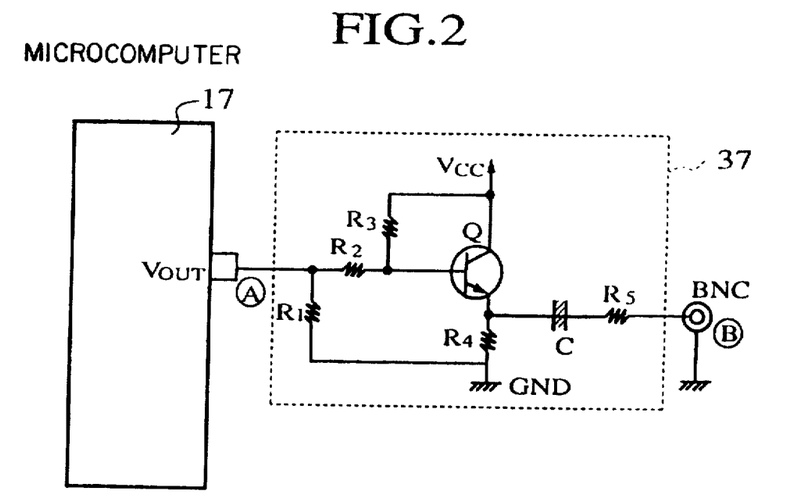
FIG. 2 shows a shaping circuit.

The TV set further has a microcomputer 17 incorporating a quasi-composite video signal generator 17a. The quasi-composite video signal generator 17a artificially generates composite video signals to test and adjust the peripheral elements of the CRT 1 during a finishing process of the TV set. The quasi-composite video signal generator 17a provides a three-state output signal Vout having three states of "high impedance", "1", and "0". The signal Vout is converted by a shaping circuit 37 into a quasi-composite video signal Sqcv, which is sent to a video amplifier 38. FIG. 2 shows an example of the shaping circuit 37. The video amplifier 38 provides a synchronous signal and a color signal. The synchronous signal is passed through a deflector 39 and is applied to the deflection yoke 5. The color signal is sent to a color signal reproducer 41, which provides the R, G, and B drivers 11, 12, and 13 with R, G, and B color signals, respectively.

Figures 3A, 3B:
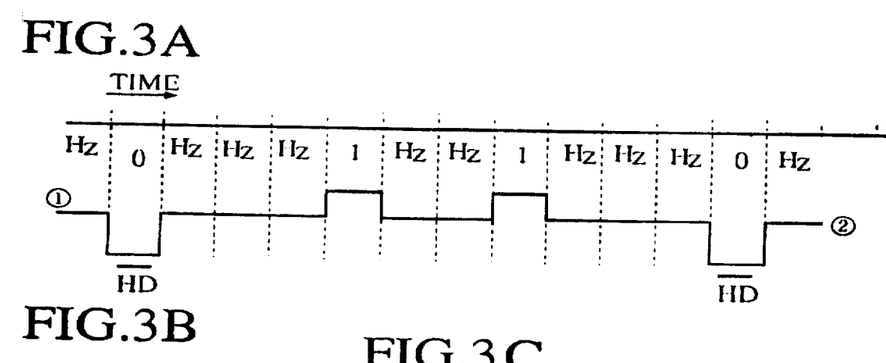
FIG. 3A is a timing chart showing a quasi-composite video signal formed by the shaping circuit.
FIG. 3B Shows an image displayed on a screen in response to the quasi-composite video signal.
Figure 3C:
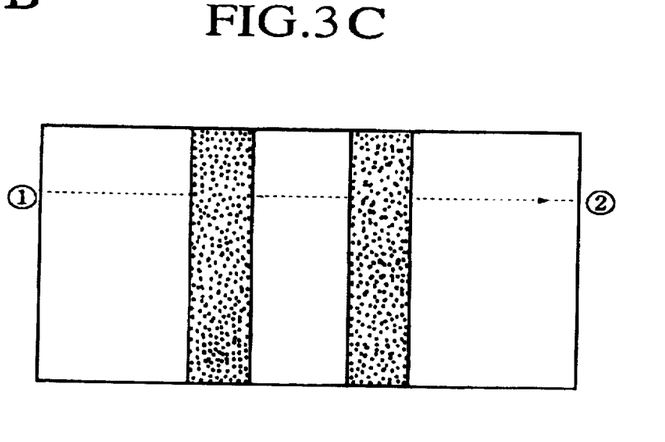

FIG. 3A is a timing chart showing an input signal A and an output signal B of the shaping circuit 37 of FIG. 2. FIG. 3B shows an image displayed on the TV set according to the signals of FIG. 3A. The microcomputer 17 provides the three-state output signal Vout having three states of "high impedance (Hz)", "0", and "1", and the shaping circuit 37 provides the quasi-composite video signal Sqcv, i.e., the output signal B of FIG. 3A according to the signal Vout. Then, the image of FIG. 3B is displayed according to the signal Sqcv. In FIG. 3A, HD is a horizontal synchronous pulse.

Returning to FIG. 1, the second grid electrodes G2 of the CRT 1 are connected to a screen adjuster 18 that adjusts second grid voltages applied to the respective second grid electrodes G2. The screen adjuster 18 is controlled by a variable-resistance knob arranged on the chassis or control panel of the TV set.

FIG. 4 is a block diagram showing the inside of the quasi-composite video signal generator 17a of FIG. 1. The quasi-composite video signal generator 17a has a reference clock pulse generator 21 for generating reference clock pulses CK, a horizontal period counter 22 for repeatedly counting the reference clock pulses CK for each normal horizontal period and generating horizontal synchronous pulses HCK, and a vertical period counter 23 for repeatedly counting the horizontal synchronous pulses HCK for each normal vertical period. The output of the horizontal period counter 22 is connected to a horizontal position decoder 24, and the output of the vertical period counter 23 is connected to a vertical position decoder 25. The standard NTSC system involves a horizontal period of 63.5 microseconds and a vertical period of 262.5 counts of the HCK pulses. The horizontal position decoder 24 generates a quasi-horizontal synchronous signal HDV and a horizontal timing signal S11 according to a count value of the horizontal period counter 22. The vertical position decoder 25 generates a quasi-vertical synchronous signal VDV and a vertical timing signal S12 according to a count value of the vertical period counter 23. The outputs of the horizontal and vertical position decoders 24 and 25 are connected to a signal generator 27. The signal generator 27 is connected to a display setting unit 28 that provides a display setting signal S13 for setting an image to be displayed. The signal generator 27 selects one of the timing signals S11 and S12 according to the display setting signal S13, synthesizes the selected timing signal and the quasi-horizontal and vertical synchronous signals HDV and VDV, and provides a three-state signal Vout having three states of "high impedance", "1", and "0".

Figure 5:
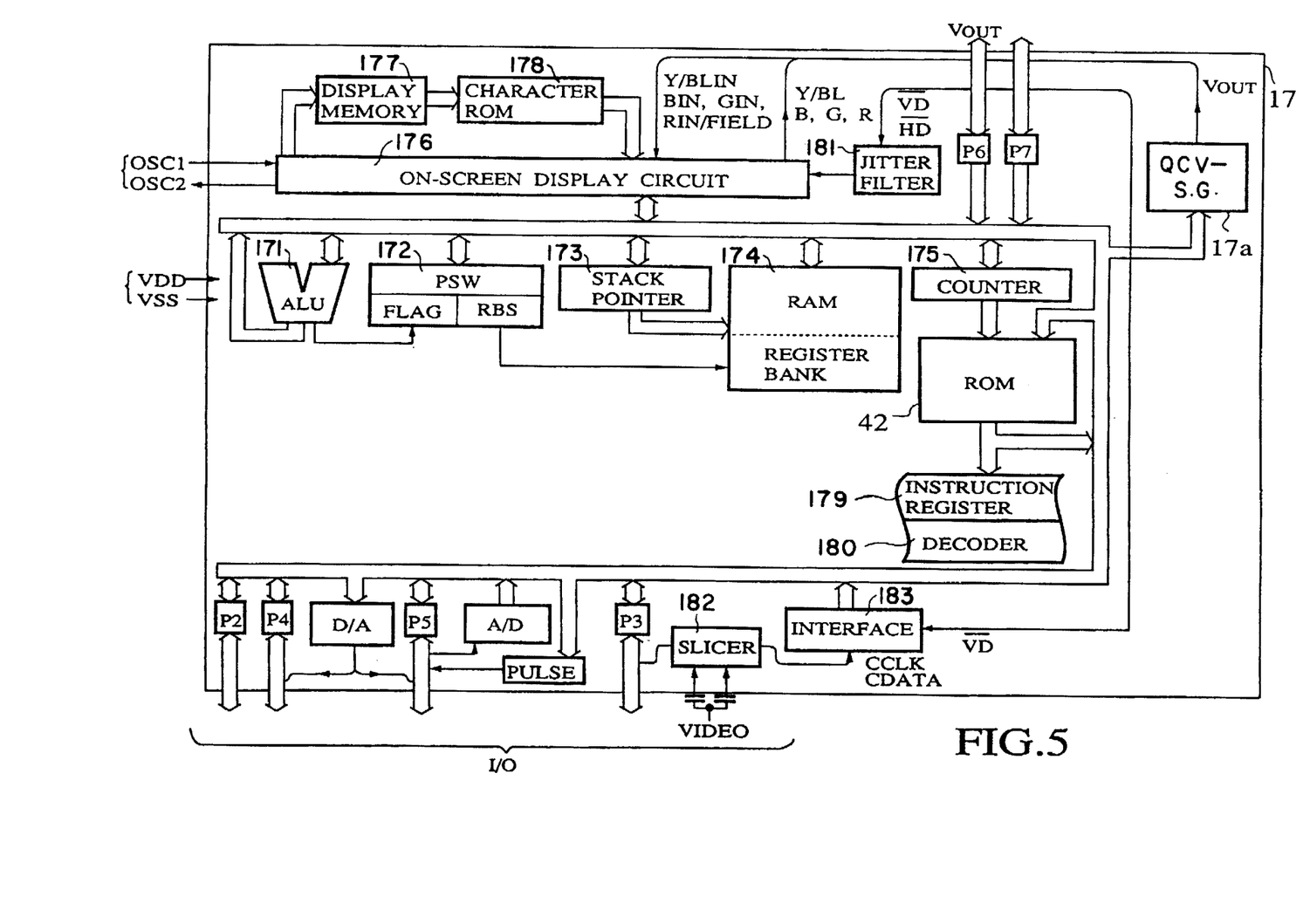
FIG. 5 is a block diagram schematically showing a microcomputer 17 with a system controller, an interrupt controller, etc., being omitted.

FIG. 5 is a block diagram showing the microcomputer which is almost the same as a conventional microcomputer, except that it incorporates a quasi-composite video signal generator 17a according to the present invention. The microcomputer 17 may include an arithmetic and logic unit (ALU) 171, a program status word (PSW) register 172, stack pointer 173, a RAM 174 having a register bank, and an on-screen display circuit 176, which are connected to each other by a bus 190. A display memory 177, a character ROM and a jitter filter 181 are connected to the on-screen display circuit 176. The video signal is inputted to an interface 183 through slicer 182. A program memory (ROM) 42 is connected to decoder 180 through instruction register 179. A counter 175 is connected to the ROM 42. For the sake of simplicity, an interrupt controller, a system controller, a timing generator, etc., are not shown in the figure. A signal corresponding to a required quasi-composite video signal is entered into the microcomputer 17 through a remote controller, a control panel attached to the chassis of the TV set, or a control panel incorporated in the TV set. In response to the entered signal, a program memory (ROM) 42 of the microcomputer 17 sends a signal to the display setting unit 28 in the quasi-composite video signal generator 17a, which provides a display setting signal S13 as shown in FIG. 4. In response to the display setting signal S13, the signal generator 27 provides a three-state signal having three states of "high impedance", "1", and "0" as an output signal Vout of the microcomputer 17.

Figure 6A:
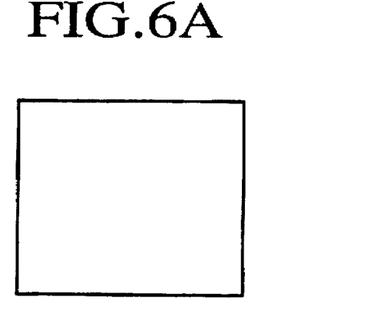
FIG. 6a–6g shows examples of images displayed in response to different quasi-composite video signals.
Figure 6B:
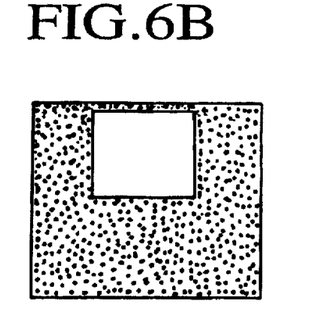
Figure 6C:
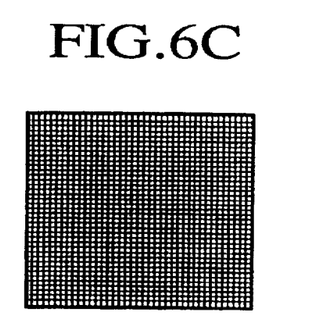

The signal Vout is converted by the shaping circuit 37 into a quasi-composite video signal Sqcv. The signal Sqcv may represent a total white image of FIG. 6A, a white-and-black image of FIG. 6B, a monochromatic image of red, green, or blue of FIG. 6C, a crosshatch image of FIG. 6D, a dot image of FIG. 6E, a cross-and-dot image of FIG. 6F, or a black cross image of FIG. 6G according to required adjusting work. Although FIG. 6C shows closely arranged crosshatches to discriminate the figure from FIG. 6A, it actually displays a monochromatic image.

Various tests and adjustments to be carried out on a TV set during a finishing process will be explained.

(1) Continuous heat run

A continuous heat run is carried out to detect initial defects in the CRT 1 or other components of the TV set. White color that incurs heaviest load is displayed on the CRT 1 for a predetermined period. Namely, the remote controller is used to set the display setting unit 28 of the quasi-composite video signal generator 17a to a total white mode, to generate a quasi-total white video signal Sqcv, which is supplied to the cathode electrodes K of the CRT 1 through the video amplifier 38, color signal reproducer 41, and R, G, and B drivers 11, 12, and 13. As a result, the CRT 1 entirely displays white for the predetermined period as shown in FIG. 6A. This white image is used to find initial defects.

In this way, the present invention is capable of easily carrying out a continuous heat run in a finishing process of a TV set without wiring between the TV set and an external circuit, thereby reducing the time and cost of the finishing process.

(2) White balance

To accurately reproduce a black-and-white image on the CRT 1, a ratio among electron beams from the three electron guns 2 must be fixed at a certain value according to the emission efficiency of the phosphor screen 7. This ratio must be constant in bright and dim parts of an image. If there is a difference between them, the white-and-black image will be colored, and the CRT 1 will be incapable of correctly reproducing colors according to broadcasted color signals. To carry out a white balance test, the operation points and anode current characteristics of the R, G, and B electron guns 2 are adjusted so that bright and dim parts of an image show no color. More precisely, a screen adjustment, red, green, and blue cut-off level adjustments, and blue and red (green) drive voltage adjustments are carried out on the CRT 1 as follows:

<1> The remote controller is used to enter a predetermined signal to the microcomputer 17, to cancel all automatic adjustments of the TV set. The display setting unit 28 of the quasi-composite video signal generator 17a is set to a white-and-black mode, to provide a white-and-black quasi-composite video signal Sqcv. The signal Sqcv is supplied to the three cathode electrodes K of the CRT 1 through the video amplifier 38, color signal reproducer 41, and R, G, and B drivers 11, 12, and 13. As a result, the CRT 1 displays a white-and-black image as shown in FIG. 6B.

<2> The remote controller or control panel is used to drop contrast to the lowest level and brightness to the maximum level. Variable-resistance knobs are manipulated to drop the screen adjustment and the red, green, and blue cut-off adjustments to their lowest levels. Thereafter, each of the knobs is returned by about ¼ turns.

<3> A service switch of the control panel is changed to display a horizontal raster. The screen adjusting variable-resistance knob is slowly turned, to slightly show any one of red, green, and blue.

<4> The cut-off adjusting variable-resistance knobs are manipulated to increase anode currents for respective colors, to slightly show red, green, and blue. The service switch is returned to the original position.

<5> The red and blue driver adjusting variable-resistance knobs, or the green and blue driver adjusting variable-resistance knobs are manipulated to adjust the white-and-black image on a bright screen such that the image has no color. Thereafter, the brightness is adjusted to a dim level, to confirm that no color is displayed on the dim screen. If any color is seen, the steps <1> to <5> are repeated.

The white balance adjustment may be carried out with the use of a white balance adjusting and measuring device. This device must be sometimes calibrated. In this case, the TV set provides a red, green, or blue monochromatic reference signal to the device. To achieve this, the remote controller is used to set the display setting unit 28 of the quasi-composite video signal generator 17a of the TV set to an R, G, or B monochromatic display mode, to provide an R, G, or B monochromatic quasi-composite video signal Sqcv. The signal Sqcv is supplied to the cathode electrodes K of the CRT 1 through the video amplifier 38, color signal reproducer 41, and R, G, and B drivers 11, 12, and 13, to display a red, green, or blue monochromatic image on the CRT 1 as shown in FIG. 6C. This image is used to calibrate the white balance adjusting and measuring device.

In this way, the present invention is capable of easily adjusting white balance in a finishing process or in maintenance work of a TV set without special wiring, thereby reducing the time and cost of the finishing process. The present invention is capable of adjusting white balance without power source or other external devices at the site of maintenance work, to thereby improve the efficiency of the maintenance work.

The present invention is capable of easily calibrating a white balance adjusting and measuring device even if the device malfunctions at a site, to thereby improve the efficiency of maintenance work.

(3) Image deflection distortion and image amplitude

Figure 6D:
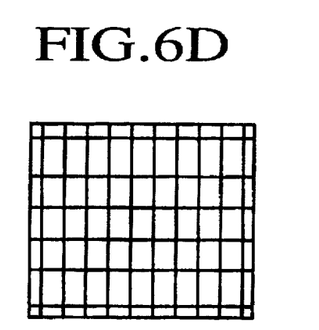

The remote controller is used to enter a predetermined input signal into the microcomputer 17, to set the display setting unit 28 of the quasi-composite video signal generator 17a to a crosshatch mode, to generate a crosshatch quasi-composite video signal Sqcv. The signal Sqcv is supplied to the cathodes K of the CRT 1 through the video amplifier 38, color signal reproducer 41, and R, G, and B drivers 11, 12, and 13. As a result, the CRT 1 displays a grid pattern as shown in FIG. 6D. This image is used to test and adjust deflection distortion and amplitude.

In this way, the present invention is capable of easily testing and adjusting the deflection distortion and amplitude of an image to be displayed on a TV set during a finishing process or maintenance work of the TV set, without special wiring, thereby reducing the time and cost of the finishing process. The present invention is capable of carrying out maintenance work of a TV set at a site without an external quasi-composite video signal generator, a power source, etc., for R, G, and B drivers of the TV set, thereby improving the efficiency of the maintenance work.

(4) Screen

Figure 6E:
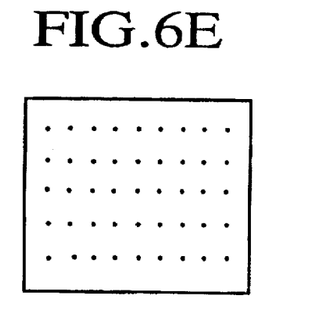

A predetermined signal is given to the microcomputer 17, to set the display setting unit 28 of the quasi-composite video signal generator 17a to a dot pattern mode to generate a dot pattern quasi-composite video signal Sqcv. The signal Sqcv is supplied to the cathode electrodes K of the CRT 1 through the video amplifier 38, color signal reproducer 41, and R, G, and B drivers 11, 12, and 13. As a result, the CRT 1 displays a dot pattern as shown in FIG. 6E. The dot pattern is used to adjust the screen of the CRT 1.

In this way, the present invention is capable of easily testing and adjusting the screen of a TV set during a finishing process or maintenance work of the TV set without special wiring. The present invention is safe to carry out such test and adjustment because no wiring is needed around a CRT that involves high-voltage peripheral circuits. The present invention reduces the time and cost of the finishing process. The present invention is capable of carrying out maintenance work at a site without an external signal generator, a power source, etc., to thereby improve the efficiency of the maintenance work.

(5) Convergence

Figure 6F:
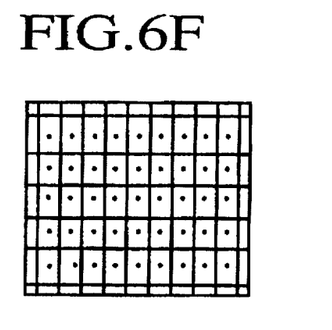

The CRT 1 is designed so that the G electron gun 2 of the CRT 1 is on the center axis of the CRT 1, and electron beams from the R and B electron guns 2 overlap an electron beam from the G electron gun 2 at a spot on the phosphor screen 7. In practice, however, they usually slightly shift from one another. Accordingly, the static convergence magnet 4 applies a magnetic field to overlap the three electron beams at the center of the screen. This adjustment is called a convergence adjustment, which is carried out as follows:

<1> The remote controller is used to enter a predetermined signal into the microcomputer 17, to set the display setting unit 28 of the quasi-composite video signal generator 17a to a cross-and-dot mode to generate a cross-and-dot quasi-composite video signal Sqcv. The signal Sqcv is supplied to the cathode electrodes K of the CRT 1 through the video amplifier 38, color signal reproducer 41, and R, G, and B drivers 11, 12, and 13. Then, the CRT 1 displays a dot-and-grid pattern as shown in FIG. 6F.

<2> The static convergence magnet 4 is formed of a four-pole magnet and a six-pole magnet as explained before. The four-pole magnet is adjusted according to a crosshatch at the center of the screen so that red and blue vertical lines overlap with each other to show magenta. The four-pole magnet is further adjusted to overlap red and blue horizontal lines to show magenta.

<3> The six-pole magnet is adjusted to overlap the vertical magenta line and a vertical green line to show magenta, and to overlap the horizontal magenta line and a horizontal green line to show white.

The steps <1> to <8> overlap the vertical red, green, and blue lines as well as the horizontal red, green, and blue lines at the center of the screen.

<4> Chromatic aberration at the periphery of the screen is adjusted. Namely, the deflection yoke 5 is vertically and horizontally moved to overlap red, green, and blue. Thereafter, a rubber wedge is inserted between the cone of the CRT 1 and the deflection yoke 5, to fix the deflection yoke 5.

In this way, the present invention is capable of easily and safely carrying out a convergence adjustment during a finishing process and maintenance work of a TV set without special wiring, thereby reducing the time and cost of the finishing process. The present invention is capable of carrying out maintenance work at a site without an external signal generator, to thereby improve the efficiency of the maintenance work.

(6) Color purity

Figure 6G:
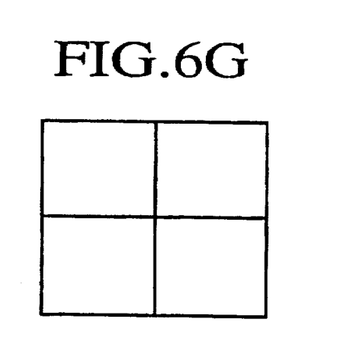

The CRT 1 is designed so that electron beams emitted from the R, G, and B electron guns 2 hit red, green, and blue elements on the phosphor screen 7, respectively. In practice, however, the electron beams sometimes miss the corresponding elements due to manufacturing errors in the electron guns 2, a mismatched combination of the electron guns 2 and deflection yoke 5, and external magnetic fields, to cause chromatic aberration, i.e., a color purity defect. A color purity adjustment is carried out to uniformly display colors on the whole screen. The remote controller or control panel is used to enter a predetermined signal into the microcomputer 17, to set the display setting unit 28 of the quasi-composite video signal generator 17a to a cross pattern mode to generate a black cross quasi-composite video signal Sqcv. The signal Sqcv is supplied to the cathodes K of the CRT 1, to display a cross pattern on the CRT 1 as shown in FIG. 6G. According to the cross pattern, the deflection yoke 5 is slightly moved back and forth and the color purity magnet 3 is adjusted, so that the CRT 1 may uniformly display colors at any part on the screen.

In this way, the present invention is capable of easily adjusting color purity during a finishing process or maintenance work of a TV set, thereby reducing the time and cost of the finishing process and improving the efficiency of the maintenance work. Presently, high-quality large-sized CRTs are required. The color purity defects frequently occur in large-sized CRTs having a large deflection angle. The present invention easily adjusts the color purity of a large-sized CRT and reduces the time and cost of the adjustment. Generally, TV sets are correctly adjusted before shipment, to secure stable operation and reliability. Accordingly, it is usually not necessary to adjust the TV sets at home. The color purity of TV sets, however, is affected by magnetic fields generated by magnetized iron reinforcements and skeletons of houses, or by the Earth's field. It is, therefore, sometimes necessary to readjust the color purity. The present invention is capable of easily and quickly adjusting the color purity at home without an external power source for R, G, and B drivers nor complicated wiring.

Although the present invention has been explained in connection with TV sets of standard NTSC system, the present invention is also applicable to TV sets of HDTV (High Definition Television) system. The present invention is applicable not only to color TV sets but also to monochromatic TV sets. The present invention may be adopted not only for TV sets but also for displays of measuring equipment, computers, game units, etc. The present invention is particularly useful for VLS (Very Large Screen) tubes.

Various modifications will become possible for those skilled in the art after receiving the teachings of the present disclosure without departing from the scope thereof.

What is claimed is:

1. A quasi-composite video signal generator in a display unit comprising:
 (a) a synchronous signal generation section for generating quasi-horizontal and quasi-vertical synchronous signals according to reference clock pulses;
 (b) a display setting unit for setting an image to be displayed;
 (c) a signal generator for generating a binary digital signal according to the image set by the display setting unit and the quasi-horizontal and quasi-vertical synchronous signal; and (d) a shaping circuit for generating a three-state quasi-composite video signal based on the binary digital signal, the shaping circuit generating one of the values of the three-state-composite video signal when the signal generator outputs no signal, whereby the quasi-composite video signal generator is incorporated into a display unit.

2. The quasi-composite video signal generator as claimed in claim 1, wherein the synchronous signal generation section comprises:

(a) a reference clock pulse generator;

(b) a horizontal period counter for repeatedly counting reference clock pulses provided by the reference clock pulse generator for each horizontal period and generating horizontal synchronous pulses;

(c) a vertical period counter for counting the horizontal synchronous pulses for each vertical period;

(d) a horizontal position decoder for generating the quasi-horizontal synchronous signal and a horizontal timing signal according to a count value of the horizontal period counter; and (e) a vertical position decoder for generating the quasi-vertical synchronous signal and a vertical timing signal according to a count value of the vertical period counter, said signal generator selecting one of the horizontal and vertical timing signals according to the image set by the display setting unit, synthesizing the selected timing signal and the quasi-horizontal and quasi-vertical synchronous signals, and providing three-states consisting of the binary digital signal and a "high-impedance state", the "high-impedance state" corresponding to the state in which said signal generator outputs no signal.

3. The quasi-composite video signal generator as claimed in claim 1 or 2, which is incorporated into a microcomputer in the display unit.

4. A quasi-composite video signal generator as claimed in claim 3, wherein the shaping circuit is connected to the microcomputer, and the three-state quasi-composite video signal is transferred to a driver connected to a cathode ray tube (CRT) through an image amplifier connected to the shaping circuit and a color signal reproducer connected to the image amplifier.

5. A quasi-composite video signal generator incorporated in a microcomputer in a display unit comprising:

(a) a cathode ray tube (CRT) incorporating electron guns each having cathode and grid electrodes, and surrounded by a color purity magnet, a static convergence magnet, and a deflection yoke;

(b) drivers connected to the cathode electrodes, respectively;

(c) a screen adjuster connected to the grid electrodes;

(d) driver adjusters connected to said drivers, respectively, to adjust cut-off levels and drive voltages;

(e) a color signal reproducer connected to said drivers;

(f) an image amplifier connected to said color signal reproducer;

(g) a deflection circuit connected to said image amplifier and the deflection yoke, to apply a voltage to the deflection yoke;

(h) a shaping circuit connected to said image amplifier; and (i) a signal generator directly connected to the shaping circuit;

said signal generator generating a binary digital signal to provide three states of "high-impedance", "1", and "0", when a predetermined signal is applied to said microcomputer, the "high-impedance" state corresponding to the state in which said signal generator outputs no signal and the "1" and "0" state corresponding to the binary digital signal, said shaping circuit generating a three-state quasi-composite video signal, one of the three-state quasi-composite video signal corresponding to the "high impedance" state, said image amplifier providing a color signal according to the three-state quasi-composite video signal, said color signal reproducer providing, according to the color signal, said drivers with color signals, respectively, to let said CRT display an adjustment image, which is used to adjust a voltage applied to the cathode and grid electrodes as well as adjusting the positions of the color purity magnet, static convergence magnet, and deflection yoke.

6. The quasi-composite video signal generator as claimed in claim 1, wherein said shaping circuit comprises a voltage dividing circuit to generate a specific value when the signal generator outputs no signal.

7. The quasi-composite video signal generator as claimed in claim 6, wherein said voltage dividing circuit comprises:

a first resistor having first and second terminals, the first terminal being connected to a first voltage source; and a second resistor having third and fourth terminals, the third terminal being electrically coupled to the second terminal, and the fourth terminal being connected to a second voltage source.

8. The quasi-composite video signal generator as claimed in claim 7, wherein said voltage dividing circuit further comprises a third resistor connected between the second and third terminals.

9. The quasi-composite video signal generator as claimed in claim 6, wherein said shaping circuit further comprises a switching circuit.

10. The quasi-composite video signal generator as claimed in claim 7, wherein said shaping circuit further comprises a switching circuit having a transistor, the control electrode of the transistor being electrically coupled to the second terminal.

11. The quasi-composite video signal generator as claimed in claim 6, wherein said shaping circuit further comprises a filter circuit.

12. The quasi-composite video signal generator as claimed in claim 9, wherein said shaping circuit further comprises a filter circuit.

13. The quasi-composite video signal generator as claimed in claim 11, wherein said filter circuit comprises a capacitor and a resistor.

14. The quasi-composite video signal generator as claimed in claim 12, wherein said filter circuit comprises a capacitor and a resistor.

15. The quasi-composite video signal generator as claimed in claim 10, wherein said switching circuit further comprises a resister connected between one of the main electrodes of said transistor and said second voltage source providing a ground potential.

16. The quasi-composite video signal generator as claimed in claim 15, wherein said shaping circuit further comprises a filter circuit connected to said one of the main electrodes of said transistor.

17. The quasi-composite video signal generator as claimed in claim 5, wherein said shaping circuit comprises a voltage dividing circuit to generate a specific value when the signal generator outputs no signal.

18. The quasi-composite video signal generator as claimed in claim 17, wherein said voltage dividing circuit comprises:

a first resistor having first and second terminals, the first terminal being connected to a first voltage source; and a second resistor having third and fourth terminals, the third terminal being electrically coupled to the second terminal, and the fourth terminal being connected to a second voltage source.

19. The quasi-composite video signal generator as claimed in claim 17, wherein said shaping circuit further comprises a switching circuit.

20. The quasi-composite video signal generator as claimed in claim 17, wherein said shaping circuit further comprises a filter circuit.

* * * * *